United States Patent
Li et al.

(10) Patent No.: US 11,295,439 B2
(45) Date of Patent: Apr. 5, 2022

(54) IMAGE RECOVERY

(71) Applicant: International Business Machines Corporation, Armonk, NY (US)

(72) Inventors: Fan Li, Shanghai (CN); Guo Qiang Hu, Shanghai (CN); Jun Zhu, Shanghai (CN); Sheng Nan Zhu, Shanghai (CN); JingChang Huang, Shanghai (CN); Yuan Yuan Ding, Shanghai (CN); Peng Ji, Nanjing (CN)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 16/654,962

(22) Filed: Oct. 16, 2019

(65) Prior Publication Data
US 2021/0118113 A1    Apr. 22, 2021

(51) Int. Cl.
*G06T 11/60* (2006.01)
*G06T 7/00* (2017.01)
(Continued)

(52) U.S. Cl.
CPC ............ *G06T 7/001* (2013.01); *G06F 17/18* (2013.01); *G06K 9/6267* (2013.01); *G06T 11/60* (2013.01);
(Continued)

(58) Field of Classification Search
CPC .................. G06T 7/001; G06T 11/60; G06T 2207/20081; G06T 2207/30141;
(Continued)

(56) References Cited

U.S. PATENT DOCUMENTS 7,162,073 B1 *  1/2007  Akgul ............... G01N 21/8851
                                                    348/125
7,991,217 B2    8/2011  Nakagaki et al.
                        (Continued)

FOREIGN PATENT DOCUMENTS

CN      101604080 A     12/2009
CN      107430988 A     12/2017
                        (Continued)

OTHER PUBLICATIONS

Mell et al., "The NIST Definition of Cloud Computing," National Institute of Standards and Technology, NIST Special Publication 800-145, Sep. 2011, 7 pages.
(Continued)

*Primary Examiner* — Sheela C Chawan
(74) *Attorney, Agent, or Firm* — Matthew J. Bussan

(57) ABSTRACT

A method, a device and a computer program product for image processing are proposed. In the method, a first training image and region information are obtained. The region information indicates a region of a defect in the first training image. A second training image with the defect at least partially removed is generated using an image generator based on the first training image and the region information. The image generator is trained to recover the first training image by replacing pixels included in the region indicated by the region information. The image generator is updated based on the second training image. In this way, the image including the defect can be accurately and efficiently recovered.

20 Claims, 9 Drawing Sheets

(51) Int. Cl.
  *G06K 9/62* (2022.01)
  *G06F 17/18* (2006.01)
(52) U.S. Cl.
  CPC .............. *G06T 2207/20081* (2013.01); *G06T 2207/30121* (2013.01); *G06T 2207/30141* (2013.01)
(58) Field of Classification Search
  CPC . G06T 2207/30121; G06T 2207/30152; G06T 7/0004; G06K 9/6267
  USPC .......................... 382/149, 100, 155; 706/15
  See application file for complete search history.

(56) References Cited

U.S. PATENT DOCUMENTS

| | | | |
|---|---|---|---|
| 8,150,141 B2 | 4/2012 | Nakagaki et al. | |
| 8,452,076 B2 | 5/2013 | Nakagaki et al. | |
| 8,811,712 B2 | 8/2014 | Maeda et al. | |
| 10,891,725 B2* | 1/2021 | Kigawa ................. | G01N 21/95 |
| 11,030,738 B2* | 6/2021 | Li .......................... | G06K 9/6267 |
| 2002/0114506 A1* | 8/2002 | Hiroi ...................... | G06T 7/001 382/149 |
| 2007/0201739 A1 | 8/2007 | Nakagaki et al. | |
| 2011/0268345 A1 | 11/2011 | Nakagaki et al. | |
| 2011/0274342 A1 | 11/2011 | Maeda et al. | |
| 2012/0128233 A1 | 5/2012 | Nakagaki et al. | |
| 2014/0270347 A1* | 9/2014 | Xu .......................... | G06T 7/001 382/103 |
| 2018/0022015 A1 | 1/2018 | Terao | |
| 2019/0050978 A9 | 2/2019 | Sakai et al. | |
| 2019/0189083 A1* | 6/2019 | Lee ......................... | G09G 5/10 |
| 2021/0004945 A1* | 1/2021 | Li ........................... | G06T 7/001 |

FOREIGN PATENT DOCUMENTS

| | | |
|---|---|---|
| CN | 108520503 A | 9/2018 |
| CN | 109035248 A | 12/2018 |
| CN | 109118482 A | 1/2019 |
| JP | 2007225531 A | 9/2007 |
| JP | 2010151655 A | 7/2010 |
| JP | 4644613 B2 | 3/2011 |
| JP | 5275017 B2 | 8/2013 |
| JP | 6403627 B2 | 10/2018 |
| KR | 20170133501 A | 12/2017 |
| TW | 201636186 A | 10/2016 |
| WO | 2010073453 A1 | 7/2010 |
| WO | 2016166929 A1 | 10/2016 |
| WO | 2018216629 A1 | 11/2018 |
| WO | 2021005426 A1 | 1/2021 |

OTHER PUBLICATIONS

Liu et al., "Generative Image Inpainting With Neural Features", ICIMCS '18, Proceedings of the 10th International Conference on Internet Multimedia Computing and Service, Nanjing, China, Aug. 17-19, 2018, 5 pages.

Vitoria et al., "Semantic Image Inpainting Through Improved Wasserstein Generative Adversarial Networks", 13 pages, downloaded from <https://arxiv.org/pdf/1812.01071.pdf> on May 3, 2019.

Yu et al., "Generative Image Inpainting with Contextual Attention", 15 pages, downloaded from <https://arxiv.org/pdf/1801.07892.pdf> on May 3, 2019.

ISR/WO (International Search Report/Written Opinion) in International Application No. PCT/IB2020/055527 dated Sep. 16, 2020.

Bergmann et al., "Improving Unsupervised Defect Segmentation by Applying Structural Similarity to Autoencoders," arXiv:1807.02011v3 [cs.CV] Feb. 1, 2019, 8 pages.

Yu et al., "Generative Image Inpainting With Contextual Attention," arXiv:1801.07892v2 [cs.CV] Mar. 21, 2018, 15 pages.

Zhou et al., "Learning Deep Features for Discriminative Localization," CVPR, 2016, 9 pages.

U.S. Appl. No. 16/503,764, to Fan Li et al., entitled "Image Defect Identification", filed Jul. 5, 2019, assigned to International Business Machines Corporation.

List of IBM Patents or Patent Applications Treated as Related (Dated Sep. 28, 2021).

* cited by examiner

IMAGE RECOVERY

BACKGROUND

The present invention relates to image processing, and more specifically, to a method, a device and a computer program product for recovering an image including a defect.

Nowadays, there is high demand for automated and accurate defect segmentation in the manufacturing industry. The demand for automated visual inspection technologies for defect segmentation is accelerating across the manufacturing industry in areas such as manual inspection of smartphone part assembly, component-level defect inspection on Printed Circuit Board (PCB), and Liquid Crystal Display (LCD) panel defect detection.

SUMMARY

According to a first aspect of the present invention, there is provided a method for image processing. In the method, a first training image and region information are obtained. The region information indicates a region of a defect in the first training image. A second training image with the defect being at least partially removed is generated using an image generator based on the first training image and the region information. The image generator is trained to recover the first training image by replacing pixels included in the region indicated by the region information. The image generator is updated based on the second training image.

According to a second aspect of the present invention, there is provided a device for image processing. The device comprises a processing unit and a memory coupled to the processing unit and storing instructions thereon. The instructions, when executed by the processing unit, perform acts including: obtaining a first training image and region information, the region information indicating a region of a defect in the first training image; generating, based on the first training image and the region information, a second training image with the defect at least partially removed using an image generator, the image generator being trained to recover the first training image by replacing pixels included in the region indicated by the region information; and updating the image generator based on the second training image.

According to a third aspect of the present invention, there is provided a computer program product comprising a computer readable storage medium having program instructions embodied therewith. The program instructions are executable by a processor to cause the processor to perform actions of: obtaining a first training image and region information, the region information indicating a region of a defect in the first training image; generating, based on the first training image and the region information, a second training image with the defect at least partially removed using an image generator, the image generator being trained to recover the first training image by replacing pixels included in the region indicated by the region information; and updating the image generator based on the second training image.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
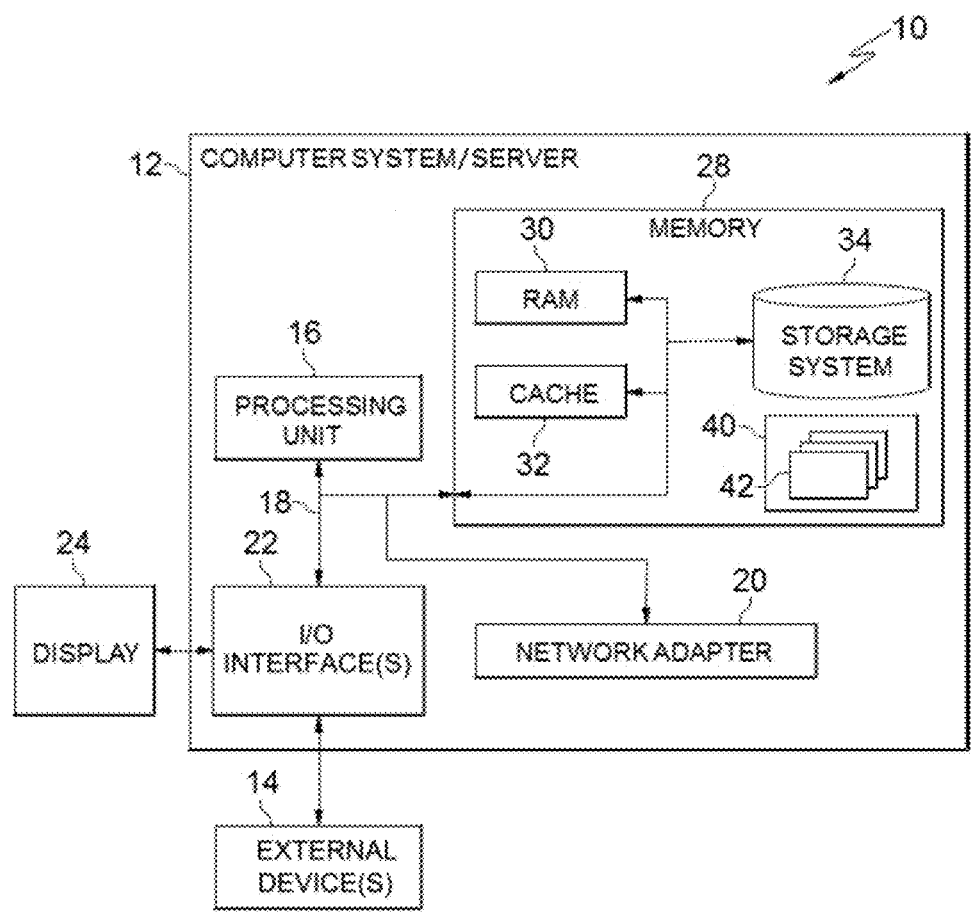
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still further, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
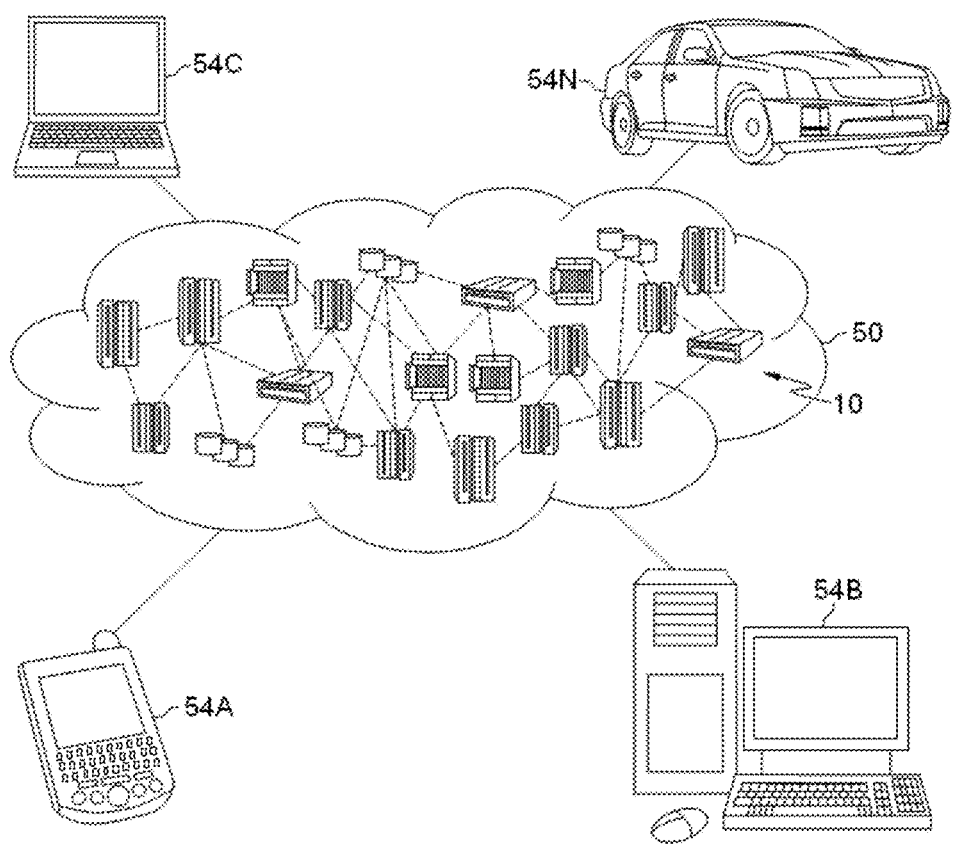
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
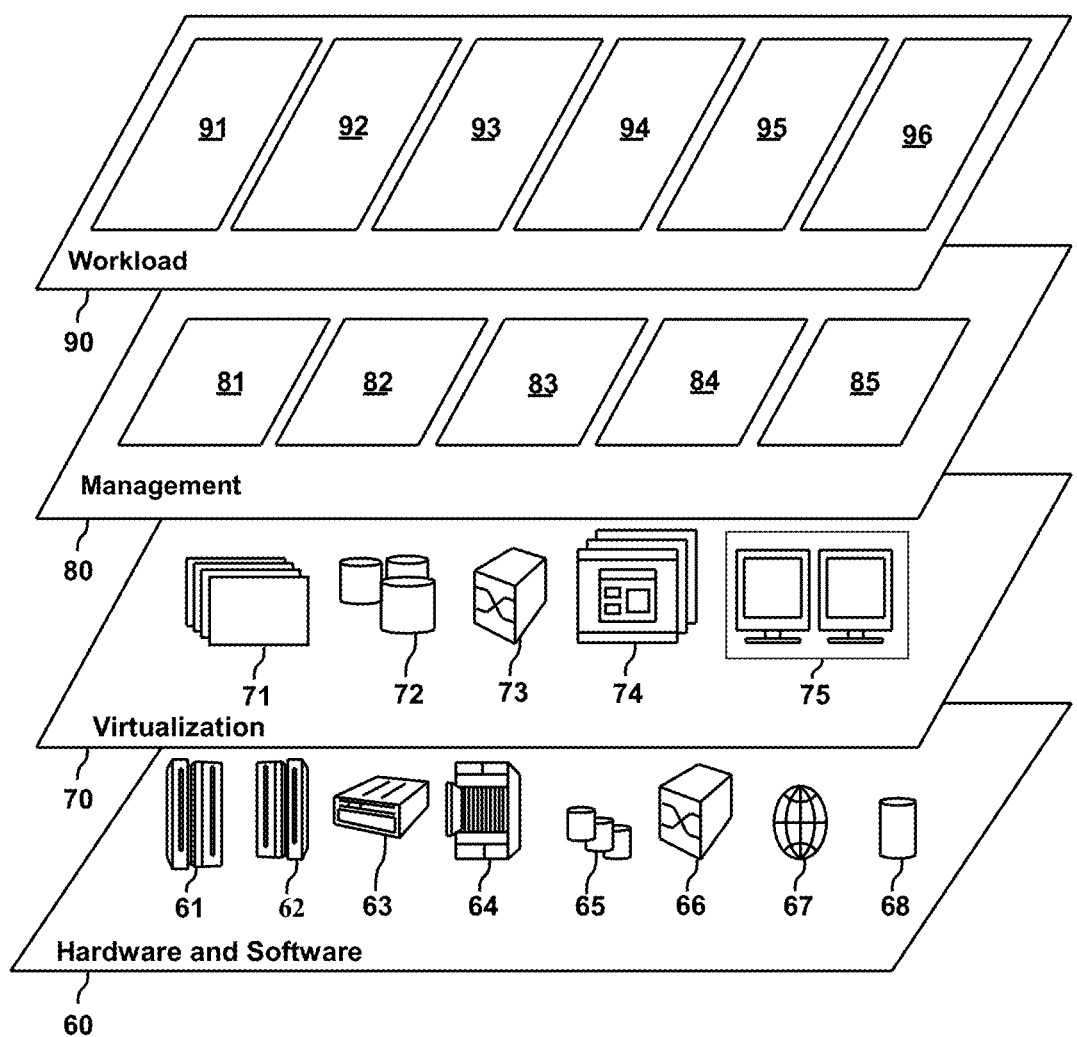
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image processing 96.

Accurate defect segmentation is of significant value for determining the defect severity and the subsequent processing flow (for example, repair, rework, ignore, disposal, etc.). Due to the large amount of workload required, the inspector is more willing to perform the annotation of the defect in an image level (for example, annotate each image with a defect type label), rather than precisely determining the defect location or performing the annotation in a pixel-wise level. However, the performance of the traditional image recovery techniques used in the image level annotation is unsatisfactory.

As discussed above, it is required to improve the image recovery capability used in the image level annotation. Traditionally, to recovery an image including a defect, a mask covering the defect can be first determined. Then, the image can be recovered by matching and copying background patches to the masked region. In addition, the image can be recovered by matching the masked region from a database with image indexing. In this case, a corresponding normal image in the database is indexed and the corresponding region in the indexed image is copied to the masked region.

Further, the image can also be recovered by applying the image with the mask to a Generative Adversarial Network (GAN) based model which is trained to remove the defect. However, the traditional GAN based model has its disadvantages.

Specifically, the traditional GAN based model includes an image generator and a discriminator (interchangeably referred to as "classifier"). In one aspect, the image generator is trained to use the image with the mask to recover the image. However, the pixel information of the masked region in the image is not used by the image generator, and thus the masked region is unavailable for recovering. As a consequence, the recovering result is usually blurry and inaccurate.

In another aspect, the classifier is trained with only a real normal image. The real image represents an image not generated by the image generator. A real normal image can represent an image of a target object which is not generated by the image generator and does not include a defect, and a real abnormal image can represent an image of a target object which is not generated by the image generator and includes at least one defect. In this case, the classifier can only distinguish the generated image from the real normal image, but it is unable to distinguish the generated image from the real abnormal image, which in turn adversely affects the recovering capability of the image generator.

In order to at least partially solve one or more of the above problems and other potential problems, example embodiments of the present disclosure propose a solution for image processing.

Generally speaking, according to embodiments of the present disclosure, the image processing process includes a training process and a testing process. In the training process, an image (referred to as "first training image") and region information are obtained. The region information indicates a region of a defect in the first training image. For example, the first training image may be an image of the LCD or PCB panel which sometimes presents a certain pattern or a periodic feature. However, it is to be noted that the first training image can be any other image with a defect included therein. In other words, the first training image is not required to have rigid patterns or templates, and thus the proposed solution is widely applicable. As an example, the defect can be, for example, a dead pixel, a scratch, a bubble or the like in the LCD panel, or poor soldering, a missing component or the like of the PCB panel.

Another image (referred to as "second training image") is generated. In the second training image, the defect has been at least partially removed. According to embodiments of the present disclosure, the second training image is generated by an image generator based on the first training image and the region information. The image generator is trained to recover the first training image by replacing pixels included in a region of the first training image indicated by the region information. For example, the pixels regarding the defect in the region are replaced with the appropriate pixels. For example, the appropriate pixels can be calculated based on pixels adjacent to the pixels regarding the defect. Advantageously, the entire first training image is directly employed by the image generator along with the region information. In this case, the pixel information of the region indicated by the region information can be used for image recovery.

Then, a similarity between the second training image and the real normal image can be determined. In addition to the similarity, the second training image can be applied to a classifier trained to distinguish the second training image from the real normal image and the real abnormal image. As such, the image generator and the classifier can be updated based on the similarity and the distinguishing result, such that the second training image generated by the image generator appears to be both real and free of the defect.

This can be achieved because the image generator trained in this way aims to generate a recovered image which highly resembles the real normal image. Meanwhile, the classifier trained as such attempts to discriminate the generated recovered image from the real image (including the real normal image and the real abnormal image). This training process repeatedly optimizes the image generator as well as the classifier, such that the recovered image generated by a well trained image generator can not be discriminated from the real normal image and the real abnormal image by the classifier.

It is to be understood that, the image generator and the classifier can be, for example, neural networks, but architectures of the image generator and the classifier are not limited.

The image generator trained in this way can then be used in the testing process. In the testing process, the image generator can recover the image including the defect, such that the defect segmentation can be performed by comparing the original image including the defect with the recovered image. In this case, the defect segmentation result of the proposed solution can be compared with the traditional defect segmentation result, so as to verify the performance of the trained image generator.

Specifically, an image (referred to as "first testing image") including a defect (interchangeably referred to as "test defect") is obtained. As with the first training image used in the training process, the first testing image can be, for example, the image of the LCD or PCB panel. Likewise, the defect can be, for example, a dead pixel, a scratch, a bubble or the like in the LCD panel, poor soldering, a missing component or the like of the PCB panel.

Then, region information (interchangeably referred to as "test region information") of the defect in the first testing image is determined. The region information indicates a region of the defect in the first testing image. In this case, another image (referred to as "second testing image") is generated based on the first testing image and the region information. In the second testing image, the defect has been at least partially removed. According to embodiments of the present disclosure, the second testing image is generated by the trained image generator based on the first testing image and region information. Just like the training process, the entire first testing image is directly employed by the image generator. As such, the background around the defect can be used for image recovery. In this way, the image including the defect can be accurately and efficiently recovered.

Figure 4:
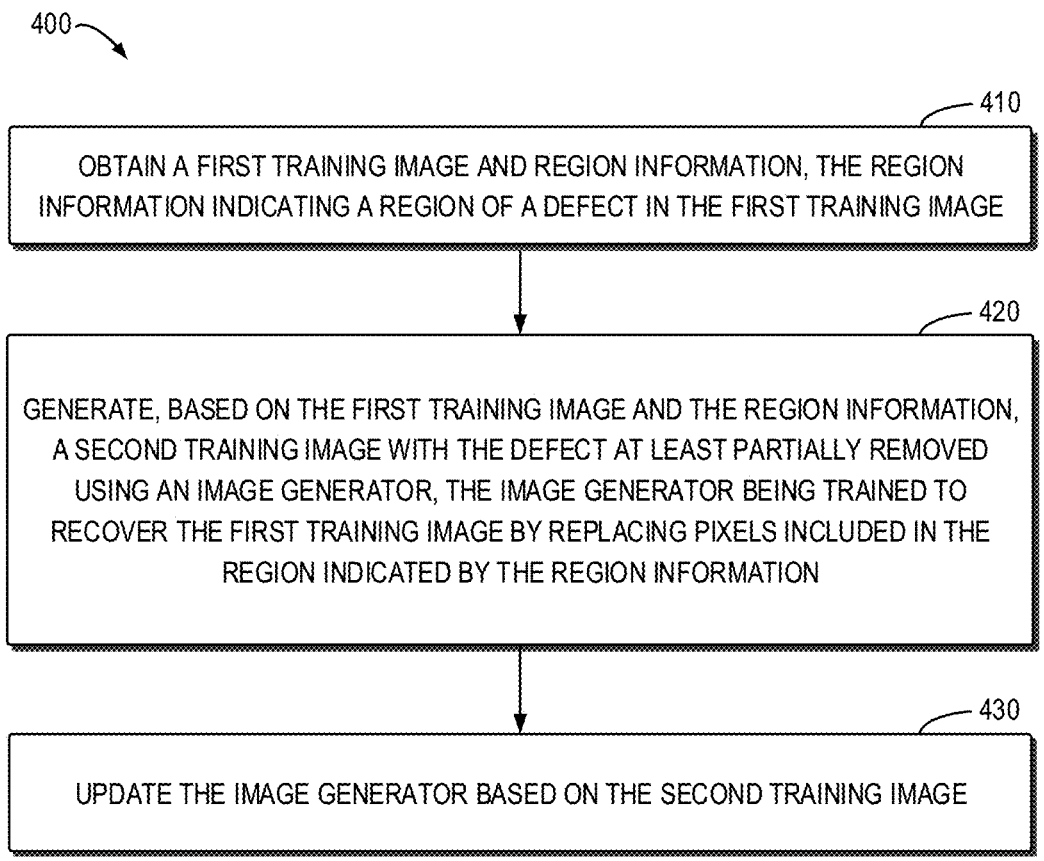
FIG. 4 shows a schematic diagram of an example method for identifying a defect in an image according to an embodiment of the present invention.
Figure 5:
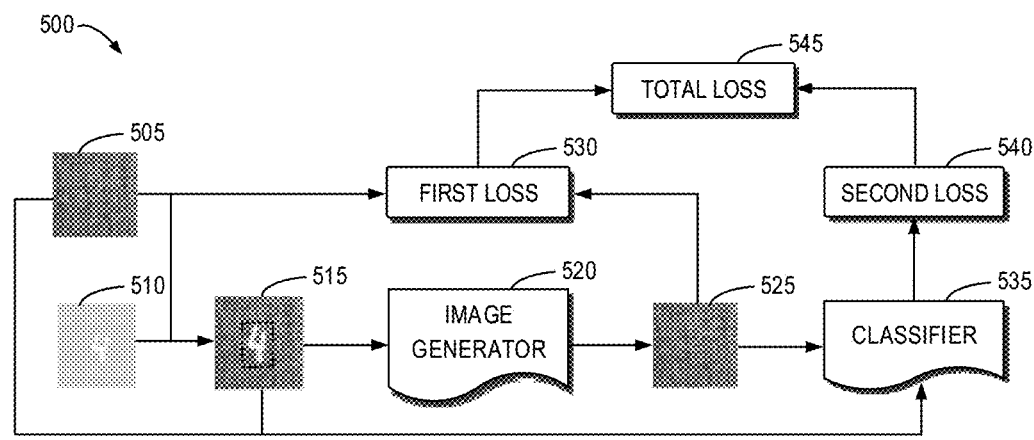
FIG. 5 shows a flow chart of an example method for training an image generator according to an embodiment of the present invention.

Now some example embodiments will be described with reference to FIGS. 4-9. FIG. 4 shows a flow chart of an example method 400 for training an image generator according to an embodiment of the present invention. The method 400 may be at least in part implemented by the computer system/server 12, or other suitable systems. FIG. 5 shows a schematic diagram of an example training process 500 according to an embodiment of the present invention. For purpose of discussion, the method 400 will be described with respect to FIG. 5.

At 410, the computer system/server 12 obtains a first training image and region information. The first training image includes a defect. The region information indicates a region of the defect in the first training image. The first training image can be obtained in a variety of ways. For example, the first training image can be a composite image obtained by combining a normal defectless image (referred to as "third training image") with an image of a defect (referred to as "fourth training image").

Specifically, as shown in FIG. 5, the computer system/server 12 can obtain the third training image 505 and the fourth training image 510, and generate the first training image 515 by superimposing the fourth training image 510 on the third training image 505. The third training image 505 is shown as a texture image, so as to indicate that the third training image 505 does not need to have a rigid pattern. In addition, the fourth training image 510 is shown as a number image that can be randomly placed over the third training image 505. The third training image 505 and the fourth training image 510 are shown for illustrative purpose, and are not limited thereto. For example, the third training image 505 can be an image of a good LCD panel, and the fourth training image 510 can be an image of a LCD panel with a dead pixel.

As to the region information, it can also be obtained in a variety of ways. For example, the computer system/server 12 can determine a coordinate of the defect in the first training image, and generate the region information based on the coordinate. As shown in FIG. 5, the coordinate of the boundary (shown as the dashed line) of the defect in first training image 515 can be determined and used as the region information to indicate the region of the defect.

At 420, the computer system/server 12 generates a second training image with the defect at least partially removed. The second training image is generated based on the first training image and the region information by an image generator. As shown in FIG. 5, the image 515, which represents the first training image with the region information, can be applied to the image generator 520. The image generator 520 can then generate the second training image 525 with the defect at least partially removed.

The image generator is trained to recover the first training image by removing the defect. For example, the defect can be removed by replacing the pixels regarding the defect with the appropriate pixels. Since the region information indicates the region of the defect, the pixels included in a region of the first training image indicated by the region information can be treated as the pixels regarding the defect. As such, the first training image can be recovered by replacing the pixels included in the indicated region.

Since the defect region is not simply removed and thus cannot be used by the image generator, the recovery of the first training image can utilize the additional pixel information in defect region. In this way, the first training image can be recovered more accurately, as compared with the blurry and inaccurate image generated by the traditional image generator.

At 430, the computer system/server 12 updates the image generator based on the second training image. In some embodiments, the computer system/server 12 can determine a first loss indicating a similarity between the second training image and the third training image, so as to update the image generator based on the first loss. As shown in FIG. 5, the first loss 530 can be determined from the second training image 525 and the third training image 505, and can then be used to adjust the parameter of the image generator 520.

The first loss can be determined in a variety of ways. For example, the differences of the corresponding pixels in the second training image and the third training image can be determined. In this case, the first loss can be determined as the sum of the absolute values of the differences. Alternatively, the first loss can be determined as the sum of the squares of the differences.

Since the updating of the image generator takes into account the similarity between the generated image (for example, the second training image 525) and the real normal image (for example, the third training image 505), the image generator can be trained to generate an image which resembles the real normal image.

In some embodiments, to further improve the training of the image generator, a classifier can be provided. The classifier can be trained to distinguish the recovered image generated by the image generator from the real normal image and the real abnormal image. In this case, in addition to the first loss, a second loss generated by the classifier can also be considered in training the image generator. The second loss can indicate a probability that the generated recovered image is an image not generated by the image generator and free of the defect. As shown in FIG. 5, the first training image 515, the second training image 525 and the third training image 505 can be applied to the classifier 535, so that the second loss 540 can be determined using the classifier 535.

Additionally, a label indicating a classification of an image can also be provided along with the image to the classifier. The real normal image is assigned with the label true ("1"), while other images are assigned with the label false ("0"). For example, the third training image 505 can be applied to the classifier 535 along with the label true ("1"), while the second training image 525 and the first training image 515 can be applied to the classifier 535 along with the label false ("0").

Then, as an example, the classifier 535 may determine that the probability of the second training image 525 being the real normal image is 0.6, and the probability of the second training image 525 being the real abnormal image is 0.4. The second loss 540 can be the cross entropy of the determined probability (0.6, 0.4), and the ground truth value (1, 0), in which "1" indicates the real normal image and "0" indicates the real abnormal image. As such, the computer system/server 12 can update the image generator 520 based on the second loss 540. For example, the parameters of the image generator 520 can be adjusted based on the second loss 540.

In some embodiments, the computer system/server 12 can determine a total loss 545 based on the first loss 530 and the second loss 640, and update the image generator 520 based on the total loss 545, such that the total loss 545 is minimized. For example, the parameters of the image generator 520 can be adjusted using the gradient descent algorithm, such that the total loss 545 is minimized.

Although the above text describes that the update of the image generator 520 is based on the first loss 530 and the second loss 540, in fact, the classifier 535 can also be updated based on the first loss 530 and the second loss 540, so as to make the total loss 545 minimized. For example, the parameters of the classifier 535 can also be adjusted using the gradient descent algorithm to make total loss 545 minimized.

In this way, the image generator can be trained to such an extent that the image generated by the image generator is both real and free of defect. The well trained image generator can then be used in the following testing process.

Figure 6:
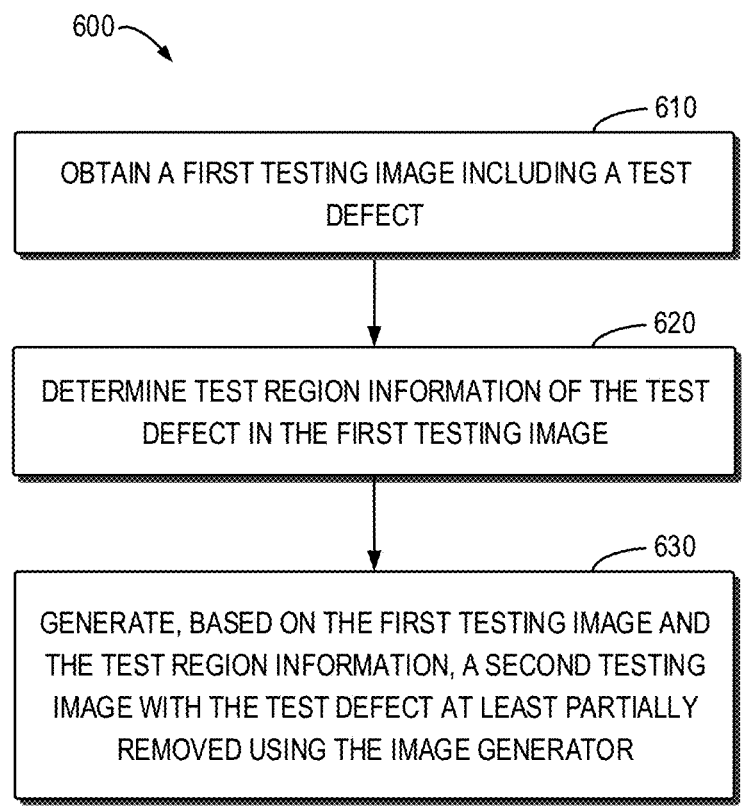
FIG. 6 shows a schematic diagram of an example training process according to an embodiment of the present invention.
Figure 7:
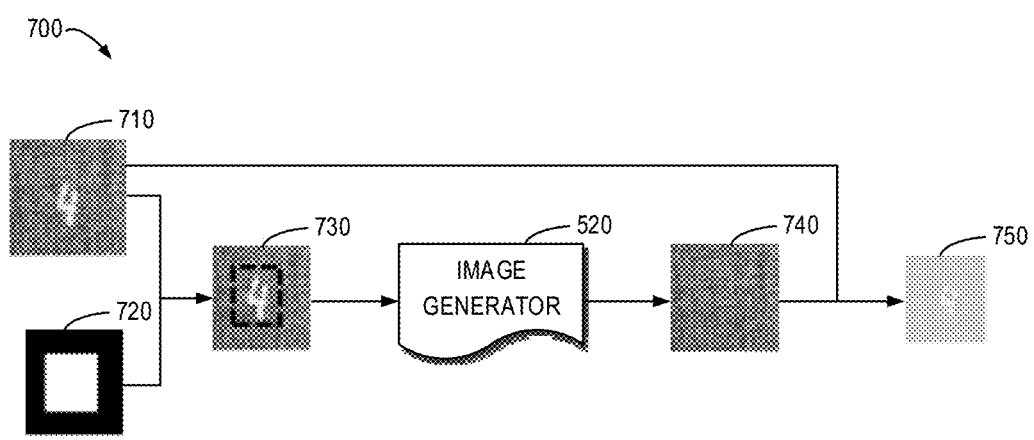
FIG. 7 shows a flow chart of an example method for testing an image generator according to an embodiment of the present invention.

FIG. 6 shows a flow chart of an example method 600 for testing an image generator according to an embodiment of the present invention. The method 600 may be at least in part implemented by the computer system/server 12, or other suitable systems. FIG. 7 shows a schematic diagram of an example testing process 700 according to an embodiment of the present invention. For purpose of discussion, the method 600 will be described with respect to FIG. 7.

At 610, the computer system/server 12 obtains a first testing image including a defect. For example, the first testing image 710 is shown as a texture image with a number placed on it as the defect. However, the first testing image 710 is shown only for illustrative purpose, and is not limited thereto. For example, the first testing image 710 can be an image of a LCD panel with a dead pixel.

At 620, the computer system/server 12 determines region information of the defect in the first testing image. In some embodiments, the computer system/server 12 can generate a mask covering at least a portion of the defect, as shown in the image 720, and determine the region information based on the mask, as shown in the image 730.

The mask can be determined by a variety of ways, such as heatmap, template matching, or any technique that can be used to locate the defect. It is to be understood that, the mask is only used to determine the region information, rather than being used to removing the masked pixels from the image.

At 630, a second testing image with the defect at least partially removed is generated. The second testing image is generated by the trained image generator based on the first testing image and the region information. For example, the image 730, which represents the first testing image with the region information, can be applied to the trained image generator 520, such that the second testing image 740 can be generated. Since the image generator 520 is well trained in the training process, the second testing image 740 generated by the image generator 520 is both real and free of the defect. As such, the image including the defect can be accurately and efficiently recovered.

Then, the computer system/server 12 can further identify the defect 750 by comparing the first testing image 710 with the second testing image 740. In this way, the defect can be segmented from the first testing image 710. For example, a simple subtraction or mathematic morphology method can be used to obtain the segmentation result from the first testing image 710 and the second testing image 740. In addition, the segmentation result can also be used as a segmentation annotation for further processing. A detailed example for defect segmentation will be described below with respect to FIG. 8.

In this way, the defect segmentation performed on the recovered image can produce a more accurate result. This can be achieved at least for the following reasons. On the one hand, the image generator is trained to recover the image by using the complete image and the region information regarding the defect, rather than removing the defect region from the image. On the other hand, the classifier is trained with both the real normal image and the real abnormal image. As such, the recovered image can be more accurate.

Figure 8:
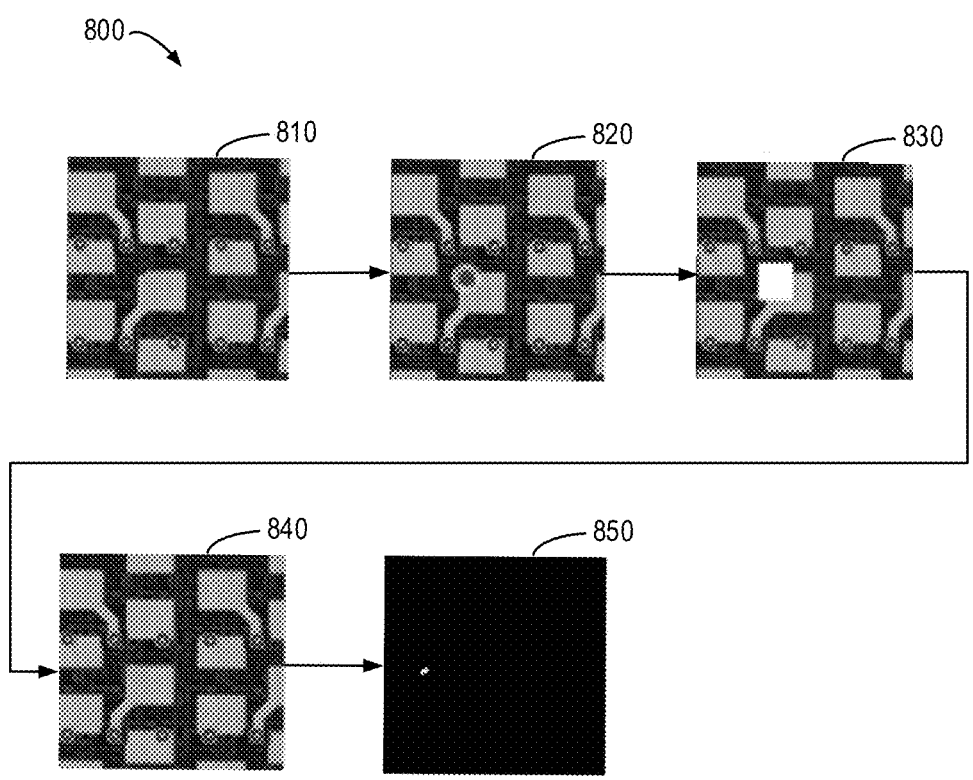
FIG. 8 shows a schematic diagram of an example testing process according to an embodiment of the present invention.

FIG. 8 shows a schematic diagram of a process 800 for identifying a defect in an image according to an embodiment of the present invention. It is to be understood that in the context of the present invention, identifying a defect in the image means that the defect segmentation is performed on the image. The process 800 may be at least in part implemented by the computer system/server 12, or other suitable systems.

The computer system/server 12 can obtain an image 810 of a target object. For example, the image 810 can be the image of the LCD or PCB panel. The image 810 can then be classified to be normal or abnormal. A normal image can represent an image of a target object that does not include a defect, and an abnormal image can represent an image of a target object including at least one defect. For example, the defect may be a dead pixel, a scratch, a bubble or the like in the LCD panel, or poor soldering, a missing component or the like of the PCB panel.

When a result of the classifying indicating that the image 810 indicates a defect, a heatmap for locating the defect in the image 810 can be generated, as shown in the image 820. In addition, a mask covering at least a portion of the defect can be generated based on the heatmap, as shown in the image 830. Then, a recovered image can be generated according to embodiments of the present disclosure. Specifically, the image to be recovered with the mask can be applied to the trained image generator 520 so as to generate the recovered image.

Then, it can be determined whether the recovered image still includes a defect. If the recovered image does not include a defect. That is to say, the recovered image is a fully recovered normal image 840, the defect in the original image 810 can be identified by comparing the original image 810 with the fully recovered normal image 840, as shown in the image 850. Otherwise, the recovered image will repeatedly go through the recovering process until a fully recovered normal image 840 is obtained, such that the defect in the original image 810 can be identified.

Figure 9:
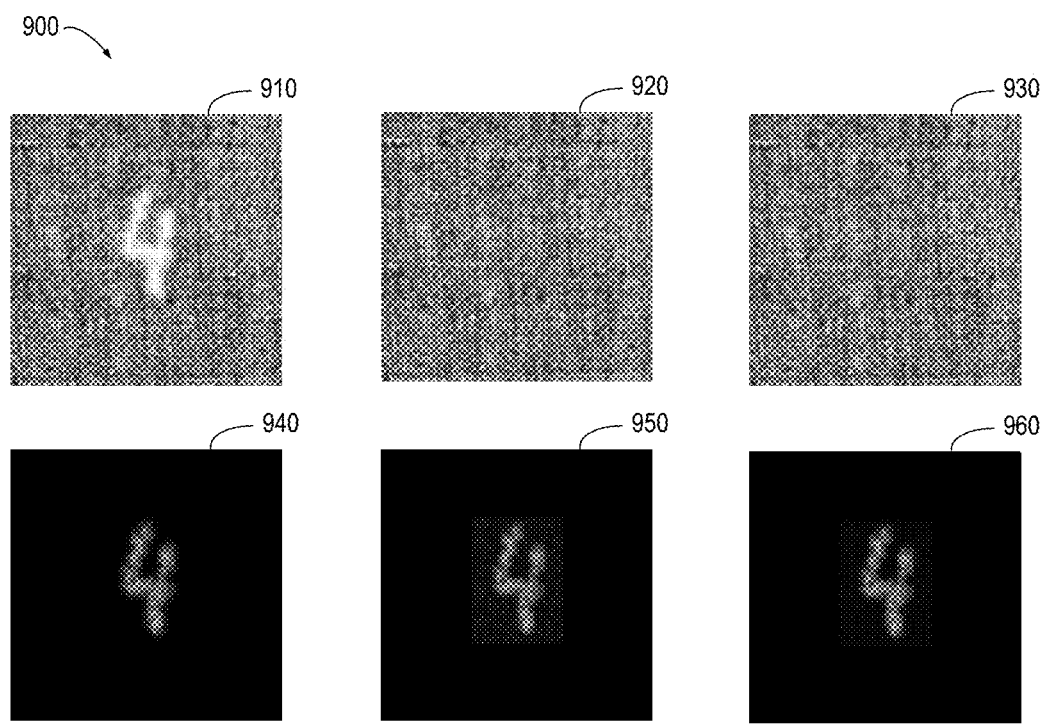
FIG. 9 shows a schematic diagram of image recovery and defect identification results according to an embodiment of the present invention.

FIG. 9 shows a schematic diagram of image recovery and defect identification results 900 according to an embodiment of the present invention. In FIG. 9, the image 910 represents the testing image, the image 920 represents the image recovered by the traditional image generator, the image 930 represents the image recovered by the proposed image generator, the image 940 represents the ground truth of defect segmentation, the image 950 represents the segmentation result with the traditional image generator, and the image 960 represents the segmentation result with the proposed image generator.

It can be seen from FIG. 9 that, the image 920 is blurry as compared with the image 930, and the segmentation result in image 950 is inferior to the segmentation result in image 960.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for image processing, comprising:
    obtaining, by one or more processors, a first training image and region information, the region information indicating a region of a defect in the first training image;
    generating, by the one or more processors, based on the first training image and the region information, a second training image with the defect at least partially removed using an image generator, the image generator being trained to recover the first training image by replacing pixels included in the region indicated by the region information; and
    updating, by the one or more processors, the image generator based on the second training image.

2. The computer-implemented method of claim 1, wherein obtaining the first training image comprises:
    obtaining, by the one or more processors, a third training image free of the defect and a fourth training image of the defect; and generating, by the one or more processors, the first training image by superimposing the fourth training image on the third training image.

3. The computer-implemented method of claim 2, wherein updating the image generator comprises:
determining, by the one or more processors, a first loss indicating a similarity between the second training image and the third training image; and
updating, by the one or more processors, the image generator based on the first loss.

4. The computer-implemented method of claim 3, wherein updating the image generator comprises:
determining, by the one or more processors, a second loss using a classifier trained to distinguish the second training image from the third training image and the first training image, the second loss indicating a probability that the second training image is an image not generated by the image generator and free of the defect; and
updating, by the one or more processors, the image generator based on the second loss.

5. The computer-implemented method of claim 4, wherein updating the image generator based on the second loss comprises:
determining, by the one or more processors, a total loss based on the first loss and the second loss;
updating, by the one or more processors, the image generator to minimize the total loss.

6. The computer-implemented method of claim 5, further comprising:
updating, by the one or more processors, the classifier to minimize the total loss.

7. The computer-implemented method of claim 1, wherein obtaining the region information comprises:
determining, by the one or more processors, a coordinate of the defect in the first training image; and
generating, by the one or more processors, the region information based on the coordinate.

8. The computer-implemented method of claim 1, further comprising:
obtaining, by one or more processors, a first testing image including a test defect;
determining, by the one or more processors, test region information of the test defect in the first testing image; and
generating, by the one or more processors, based on the first testing image and the test region information, a second testing image with the test defect at least partially removed using the image generator.

9. The computer-implemented method of claim 8, wherein determining the test region information comprises:
generating, by the one or more processors, a mask covering at least a portion of the test defect; and
determining, by the one or more processors, the test region information based on the mask.

10. The computer-implemented method of claim 8, further comprising:
identifying, by the one or more processors, the test defect by comparing the first testing image with the second training image.

11. A device for image processing, comprising:
a processor; and
a memory coupled to the processor and storing instructions thereon, the instructions, when executed by the processor, performing acts including:
obtaining a first training image and region information, the region information indicating a region of a defect in the first training image;
generating, based on the first training image and the region information, a second training image with the defect at least partially removed using an image generator, the image generator being trained to recover the first training image by replacing pixels included in the region indicated by the region information; and
updating the image generator based on the second training image.

12. The device of claim 11, wherein obtaining the first training image comprises:
obtaining a third training image free of the defect and a fourth training image of the defect; and
generating the first training image by superimposing the fourth training image on the third training image.

13. The device of claim 12, wherein updating the image generator comprises:
determining a first loss indicating a similarity between the second training image and the third training image; and
updating the image generator based on the first loss.

14. The device of claim 13, wherein updating the image generator comprises:
determining a second loss using a classifier trained to distinguish the second training image from the third training image and the first training image, the second loss indicating a probability that the second training image is an image not generated by the image generator and free of the defect; and
updating the image generator based on the second loss.

15. The device of claim 14, wherein updating the image generator based on the second loss comprises:
determining a total loss based on the first loss and the second loss;
updating the image generator to minimize the total loss.

16. The device of claim 15, wherein the acts further include:
updating the classifier to minimize the total loss.

17. The device of claim 11, wherein obtaining the region information comprises:
determining a coordinate of the defect in the first training image; and
generating the region information based on the coordinate.

18. The device of claim 11, wherein the acts further include:
obtaining a first testing image including a test defect;
determining test region information of the test defect in the first testing image; and
generating, based on the first testing image and the test region information, a second testing image with the test defect at least partially removed using the image generator.

19. A computer program product, comprising a computer readable storage medium having program instructions embodied therewith, the program instructions executable by a processor to cause the processor to perform actions including:
obtaining a first training image and region information, the region information indicating a region of a defect in the first training image;
generating, based on the first training image and the region information, a second training image with the defect at least partially removed using an image generator, the image generator being trained to recover the first training image by replacing pixels included in the region indicated by the region information; and updating the image generator based on the second training image.

20. The computer program product of claim 19, wherein the actions further include:

obtaining a first testing image including a test defect;

determining test region information of the test defect in the first testing image; and generating, based on the first testing image and the test region information, a second testing image with the test defect at least partially removed using the image generator.

* * * * *